United States Patent
Byrne et al.

(10) Patent No.: US 10,776,370 B2
(45) Date of Patent: Sep. 15, 2020

(54) COGNITIVE COUNTER-MATCHING OF MINED DATA

(71) Applicant: INTERNATIONAL BUSINESS MACHINES CORPORATION, Armonk, NY (US)

(72) Inventors: Brian P. Byrne, Austin, TX (US); Adam R. Holley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 15/705,493

(22) Filed: Sep. 15, 2017

(65) Prior Publication Data

US 2019/0087467 A1    Mar. 21, 2019

(51) Int. Cl.
| | |
|---|---|
| *G06F 16/2458* | (2019.01) |
| *G06F 16/28* | (2019.01) |
| *G06F 16/951* | (2019.01) |
| *G06F 16/2457* | (2019.01) |
| *G06F 16/9536* | (2019.01) |
| *G06F 16/2455* | (2019.01) |

(52) U.S. Cl.
CPC .... *G06F 16/2465* (2019.01); *G06F 16/24568* (2019.01); *G06F 16/24578* (2019.01); *G06F 16/285* (2019.01); *G06F 16/288* (2019.01); *G06F 16/951* (2019.01); *G06F 16/9536* (2019.01)

(58) Field of Classification Search
CPC .. G06F 16/2465; G06F 16/285; G06F 16/288; G06F 16/24578; G06F 16/951
USPC ........................................................ 707/723
See application file for complete search history.

(56) References Cited

U.S. PATENT DOCUMENTS

| | | | | |
|---|---|---|---|---|
| 7,313,515 | B2 * | 12/2007 | Crouch ................... | G06N 5/02 704/9 |
| 8,239,750 | B2 | 8/2012 | Thomsen | |
| 2010/0241639 | A1 * | 9/2010 | Kifer ..................... | G06F 16/345 707/754 |
| 2013/0275413 | A1 * | 10/2013 | Snir ..................... | H04L 67/2804 707/722 |
| 2014/0280108 | A1 * | 9/2014 | Dunn .................... | G06F 16/248 707/728 |

(Continued)

OTHER PUBLICATIONS

Wikipedia, "Text Mining," https://en.wikipedia.org/wiki/Text_mining, Printed on Apr. 28, 2017, pp. 1-10.

(Continued)

*Primary Examiner* — Hosain T Alam
*Assistant Examiner* — Nicholas E Allen
(74) *Attorney, Agent, or Firm* — Steven M. Bouknight

(57) ABSTRACT

A method for managing user information streams associated with recommendation systems based on cognitively counter-matched mined content is provided. The method may include determining and extracting first concepts from mined content. The method may further include determining second concepts associated with the determined and extracted, wherein the second concepts comprise one or more different interpretations of the first concepts. The method may further include determining relationships between the second concepts by analyzing the second concepts using data mining analysis techniques. The method may further include, based on the determined one or more relationships between the sub-concepts, counter-matching the plurality of mined content associated with each second concept. The method may also include providing alternative content to the information streams based on the counter-matched plurality of mined content.

20 Claims, 7 Drawing Sheets

(56) References Cited

U.S. PATENT DOCUMENTS

| | | | | |
|---|---|---|---|---|
| 2014/0337306 | A1* | 11/2014 | Gramatica | G06F 17/2785 707/706 |
| 2015/0363384 | A1* | 12/2015 | Williams | G06F 17/2785 704/9 |
| 2016/0110445 | A1* | 4/2016 | Andrews | G06F 16/334 707/748 |
| 2016/0133254 | A1 | 5/2016 | Vogel et al. | |
| 2016/0179945 | A1* | 6/2016 | Lastra Diaz | G06F 16/367 707/739 |
| 2016/0224537 | A1* | 8/2016 | Starostin | G06F 16/367 |
| 2016/0224893 | A1* | 8/2016 | Parker, Jr. | G06N 5/02 |
| 2016/0227282 | A1* | 8/2016 | Chang | H04N 21/4332 |
| 2016/0248719 | A1* | 8/2016 | Acharyya | H04L 51/32 |
| 2017/0140052 | A1* | 5/2017 | Bufe, III | G06F 16/9535 |

OTHER PUBLICATIONS

Kurki et al., "Agents in Delivering Personalized Content Based on Semantic Metadata," AAAI Technical Report SS-90-03, Compilation Copyright 1999 (Best date available), AAAI (www.aaai.org), pp. 84-93.

Nikolov et al., "Measuring online social bubbles," https://peerj.com/articles/cs-38/, PeerJ Comp Sci, DOI 10.7717/peerj-cs.38, Published Dec. 2, 2015, Printed on Apr. 28, 2017, pp. 1-12.

Disclosed Anonymously, "Cognitive Methodology and Mechanism/Application to Filter, Prioritize, and Re-structure/Display Blog Content Based on Flexible End User Specifications," An IP.com Prior Art Database Technical Disclosure, IP.com No. IPCOM000249061DIP.com, Electronic Publication Date: Jan. 31, 2017, pp. 1-7.

Disclosed Anonymously, "Method and System for Providing Optimal Product Selection to a Consumer by Analyzing Product Information Against Consumer Preferences," An IP.com Prior Art Database Technical Disclosure, IP.com No. IPCOM000194559DIP.com, Electronic Publication Date: Mar. 30, 2010, pp. 1-4.

Mell et al., "The NIST Definition of Cloud Computing," National Institute of Standards and Technology, U.S. Department of Commerce, Special Publication 800-145, Sep. 2011, pp. 1-7.

\* cited by examiner

COGNITIVE COUNTER-MATCHING OF MINED DATA

BACKGROUND

The present invention relates generally to the field of computing, and more specifically, to data processing and management.

Generally, data mining may include the computing process of discovering patterns in large datasets. Typically, by detecting patterns in large datasets, raw data associated with the large datasets can be turned into useful information, such as learning more about users and customers, and developing more effective marketing strategies to provide content to users, advertise to users, as well as improve sales among consumers. Furthermore, data mining tools may allow enterprises to predict future trends. Specifically, data mining may serve as a form of predictive analysis whereby new and historical data mined from the large datasets may forecast future activity, behavior and trends.

SUMMARY

A method for managing user information streams associated with recommendation systems based on cognitively counter-matched mined content is provided. The method may include determining and extracting a plurality of first concepts from a plurality of mined content associated with different online resources. The method may further include determining a plurality of second concepts associated with the determined and extracted plurality of first concepts, wherein the plurality of second concepts comprise one or more different interpretations of the plurality of first concepts. The method may further include determining one or more relationships between the determined plurality of second concepts by analyzing the determined plurality of second concepts using one or more data mining analysis techniques. The method may further include, based on the determined one or more relationships between the plurality of sub-concepts, counter-matching the plurality of mined content associated with each second concept from the determined plurality of second concepts. The method may also include providing alternative content to the information streams based on the counter-matched plurality of mined content.

A computer system for managing user information streams associated with recommendation systems based on cognitively counter-matched mined content is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining and extracting a plurality of first concepts from a plurality of mined content associated with different online resources. The method may further include determining a plurality of second concepts associated with the determined and extracted plurality of first concepts, wherein the plurality of second concepts comprise one or more different interpretations of the plurality of first concepts. The method may further include determining one or more relationships between the determined plurality of second concepts by analyzing the determined plurality of second concepts using one or more data mining analysis techniques. The method may further include, based on the determined one or more relationships between the plurality of sub-concepts, counter-matching the plurality of mined content associated with each second concept from the determined plurality of second concepts. The method may also include providing alternative content to the information streams based on the counter-matched plurality of mined content.

A computer program product for managing user information streams associated with recommendation systems based on cognitively counter-matched mined content is provided. The computer program product may include one or more computer-readable storage devices and program instructions stored on at least one of the one or more tangible storage devices, the program instructions executable by a processor. The computer program product may include program instructions to determine and extract a plurality of first concepts from a plurality of mined content associated with different online resources. The computer program product may further include program instructions to determine a plurality of second concepts associated with the determined and extracted plurality of first concepts, wherein the plurality of second concepts comprise one or more different interpretations of the plurality of first concepts. The computer program product may also include program instructions to determine one or more relationships between the determined plurality of second concepts by analyzing the determined plurality of second concepts using one or more data mining analysis techniques. The computer program product may further include, based on the determined one or more relationships between the plurality of sub-concepts, program instructions to counter-match the plurality of mined content associated with each second concept from the determined plurality of second concepts. The computer program product may also include program instructions to provide alternative content to the information streams based on the counter-matched plurality of mined content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
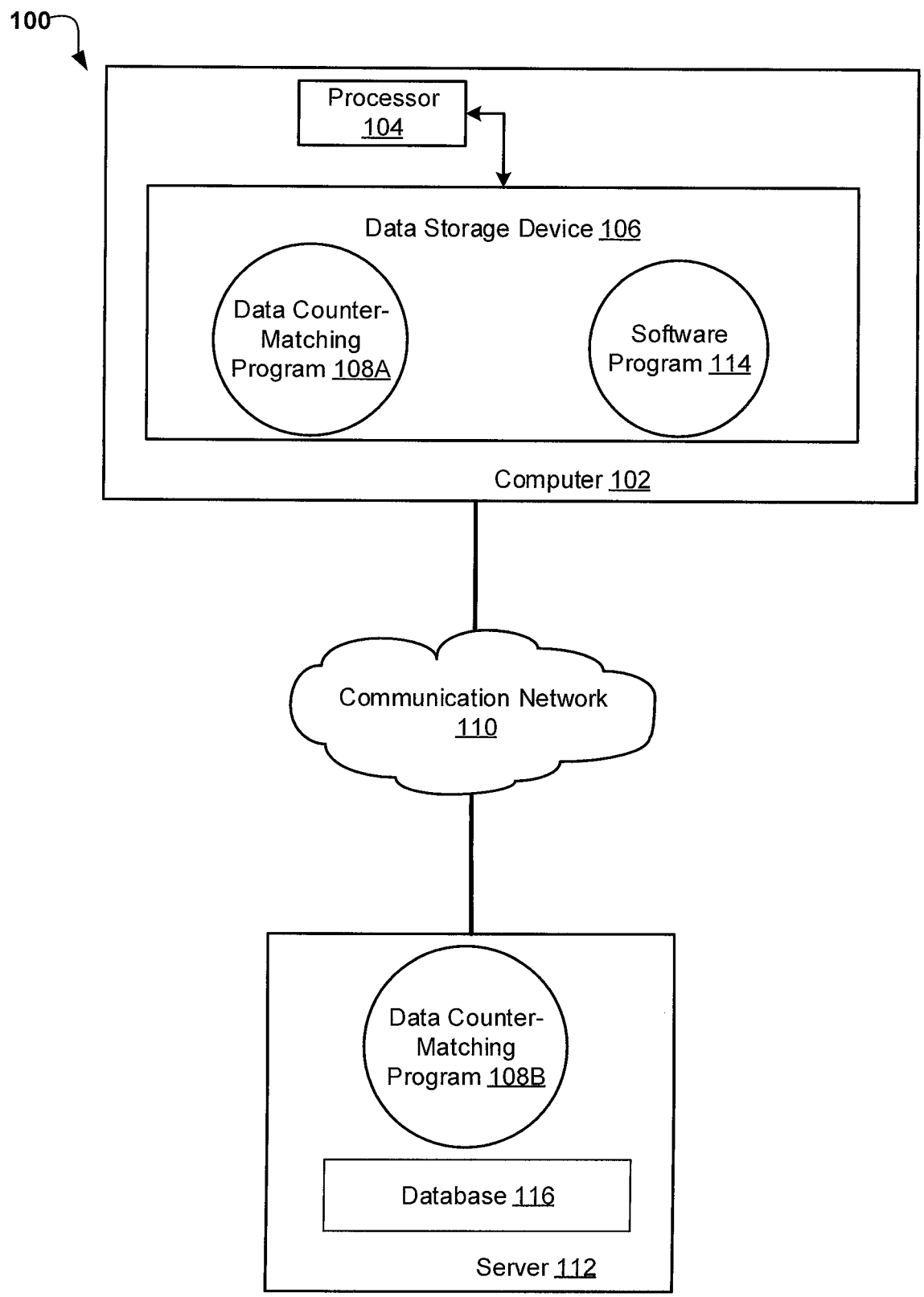
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to data processing and management. The following described exemplary embodiments provide a system, method and program product for cognitively counter-matching mined content, and providing alternative content based on the counter-matched mined content. Specifically, the present embodiment has the capacity to improve the technical field associated data mining by cognitively extracting and counter-matching mined content in order to provide alternative content to a user that may include alternative, or complementary and contradictory, viewpoints, suggestions, concepts, and interpretations that are different from the content that is typically provided and aligned with the user's activity. More specifically, the system, method and program product may cognitively counter-match mined content, and provide alternative content based on the counter-matched mined content by extracting and determining an ontology of concepts and sub-concepts associated with the mined data, determining relationships between the sub-concepts, and then recommending and providing alternative content to an information stream based on the determined relationships.

As previously described with respect to data processing and management, data mining includes the process of detecting patterns in large datasets, which may turn raw data into useful information, such as learning more about users and consumers to provide content to users and consumers based on the learned data. In such cases, information streams such as news, social media, and other formats that use mined data to provide content to users and consumers are increasingly forming social bubbles, whereby the content provided to users' information streams are derived from the preferences of the user/consumer, effectively forming a bubble containing content tailored to users' activity, preferences and beliefs. In turn, content that may contradict users' aligned activity, preferences, and beliefs may be blocked. Therefore, users may be presented with a reduced or partial view of a given problem, and/or may be deprived of information that may present alternative views, which in turn may discourage a free exchange of ideas. As such, it may be advantageous, among other things, to provide a system, method and program product for providing alternative content in users' information feeds, whereby the alternative content in order to provide a mix of content and ideology that may challenge/oppose information associated with users/consumers' preferences and search results. Specifically, the system, method, and program product may manage information streams associated with a recommendation system for a user by cognitively counter-matching mined content associated with users and the users' information streams, and providing the alternative content based on the counter-matched mined content.

According to at least one implementation of the present embodiment, concepts from mined content that are associated with different online resources may be determined and extracted. Next, sub-concepts may be determined for each of the determined and extracted concepts. Next, an analysis may be performed on the determined sub-concepts to determine relationships between the determined sub-concepts based on the analysis. Next, the mined content associated with each of the determined an extracted concepts may be counter-matched based on the determined relationships. Then, alternative content may be provided to information streams based on the counter-matched mined content.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for managing user information streams associated with recommendation systems based on cognitively counter-matched mined content.

As previously described, and according to at least one implementation, concepts from mined content that are associated with different online resources may be determined and extracted. Next, sub-concepts may be determined for each of the determined and extracted concepts. Next, an analysis may be performed on the determined sub-concepts to determine relationships between the determined sub-concepts based on the analysis. Next, the mined content associated with each of the determined an extracted concepts may be counter-matched based on the determined relationships. Then, alternative content may be provided to information streams based on the counter-matched mined content.

Referring now to FIG. 1, an exemplary networked computer environment 100 in accordance with one embodiment is depicted. The networked computer environment 100 may include a computer 102 with a processor 104 and a data storage device 106 that is enabled to run a data counter-matching program 108A and a software program 114, and may also include a microphone (not shown). The software program 114 may be an application program such as an Internet browser. The data counter-matching program 108A may communicate with the software program 114. The networked computer environment 100 may also include a server 112 that is enabled to run a data counter-matching program 108B and the communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the data counter-matching program 108A, 108B may interact with a database 116 that may be embedded in various storage devices, such as, but not limited to, a mobile device 102, a networked server 112, or a cloud storage service.

According to the present embodiment, a program, such as a data counter-matching program 108A and 108B may run on the client computer 102 or on the server computer 112 via a communications network 110. The data counter-matching program 108A, 108B may cognitively counter-match mined content, and provide alternative content based on the counter-matched mined content. Specifically, a user using a computer, such as computer 102, may run a data counter-matching program 108A, 108B, that may interact with a database 116 and a software program 114, to cognitively counter-match mined content, and provide alternative content based on the counter-matched mined content by extracting and determining an ontology of concepts and sub-concepts associated with the mined data, determining relationships between the sub-concepts, and then recommending and providing alternative content to an information stream based on the determined relationships.

Figure 2A:
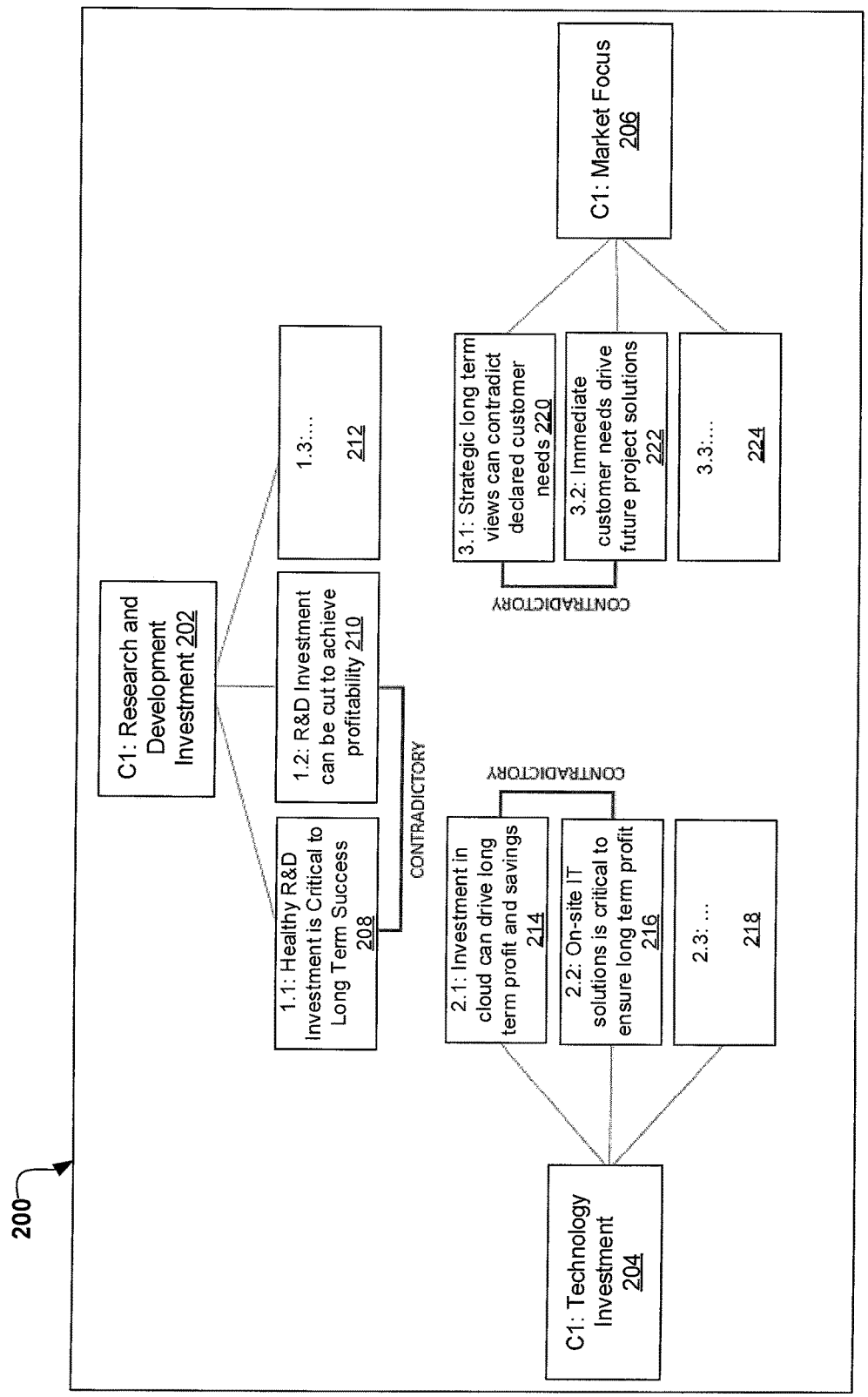
FIG. 2A is a block diagram illustrating a model for cognitively counter-matching mined content based on contradictory data according to one embodiment.
Figure 2B:
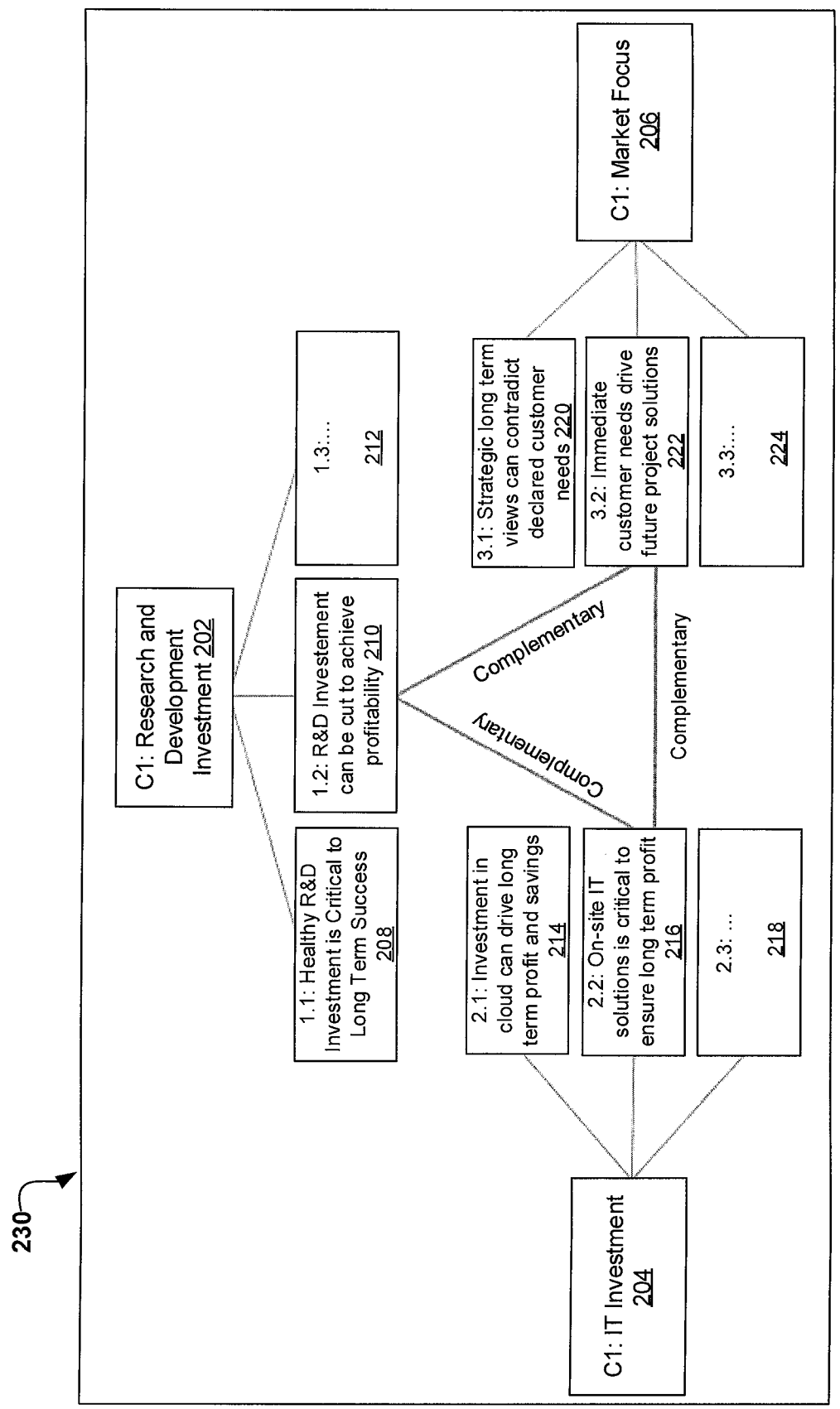
FIG. 2B is a block diagram illustrating a model for cognitively counter-matching mined content based on complementary data according to one embodiment.

Referring now to FIGS. 2A and 2B, block diagrams 200 and 230 illustrating models for cognitively counter-matching mined content are depicted. Specifically, according to one embodiment, the data counter-matching program 108A, 108B (FIG. 1) may determine and extract concepts from mined content that is associated with different resources. Specifically, the data counter-matching program 108A, 108B (FIG. 1) may mine content, and/or use a data mining service to receive mined content, from different online sources such as online news articles, publications, forums, social media websites/applications, and search engines. More specifically, the data counter-matching program 108A, 108B (FIG. 1) may use well-known data mining techniques to mine data such as by analyzing large quantities of data to extract previously unknown, interesting patterns such as groups of data records (cluster analysis), unusual records (anomaly detection), and dependencies (association rule mining, sequential pattern mining), and may use database techniques such as spatial indices. The extracted patterns may be used to summarize the analyzed data, and/or used in further analysis, for example, in machine learning and predictive analytics for further tracking online content.

Thereafter, the data counter-matching program 108A, 108B (FIG. 1) may determine and extract concepts 202, 204, 206 and sub-concepts 208, 210, 212, 214, 216, 218, 220, 222, 224 associated with the mined content by analyzing the mined content. As previously described, the data counter-matching program 108A, 108B (FIG. 1) may mine content from different online sources such as online news articles, publications, forums, social media websites/applications, and search engines. For example, the data counter-matching program 108A, 108B (FIG. 1) may mine content that may include a series of online publications comprising discussions on investment. Furthermore, according to one embodiment, by analyzing the online publications, the data counter-matching program 108A, 108B (FIG. 1) may determine and extract concepts associated with the online publications, whereby each determined and extracted concept may categorize a sub-set of the online publications (i.e. a group of online publications) and/or portions of the online publications (i.e. sections within online publications) based on the included text. For example, the data counter-matching program 108A, 108B (FIG. 1) may mine text from the online publications associated with investment, and by analysis, may determine that a sub-set of the online publications include discussions on research and development investment, a sub-set of the online publications include discussions on information technology (IT) investment, and a sub-set of the online publications include discussions on market focus. Therefore, the data counter-matching program 108A, 108B (FIG. 1) may determine and extract the concepts Research and Development (R&D) Investment 202, Information Technology (IT) Investment 204, and Market Focus 206.

Additionally, by analyzing the online publications, the data counter-matching program 108A, 108B (FIG. 1) may determine sub-concepts 208, 210, 212, 214, 216, 218, 220, 222, 224 associated with each of the determined and extracted concepts 202, 204, 206. Specifically, the data counter-matching program 108A, 108B (FIG. 1) may determine sub-concepts 208, 210, 212, 214, 216, 218, 220, 222, 224 that may include detailed interpretations and/or views associated with the determined and extracted concepts 202, 204, 206. For example, for the determined and extracted concept, Research and Development Investment 202, the data counter-matching program 108A, 108B (FIG. 1) may analyze the online publications associated with research and development investment to determine that certain text suggests that healthy R&D investment is critical to long term success 208, while certain text may suggests that R&D costs can be cut to achieve profitability 210. Also, for example, for the determined and extracted concept, IT Investment 202, the data counter-matching program 108A, 108B (FIG. 1) may analyze the online publications associated with IT investment to determine that certain text may suggest that investment in cloud can drive long term profit and savings 214, while certain text may suggest that investment in on-site IT solutions is critical to ensure long term profit 216. Furthermore, for example, for the determined and extracted concept, Market Focus 206, the data counter-matching program 108A, 108B (FIG. 1) may perform text analysis on the online publications associated with market focus to determine that certain text suggests that strategic long term views can contradict declared customer needs 220, while certain text may suggest that immediate customer needs drive future project solutions 222.

Thereafter, the data counter-matching program 108A, 108B (FIG. 1) may analyze the determined sub-concepts 208, 210, 212, 214, 216, 218, 220, 222, 224 to determine relationships between the sub-concepts 208, 210, 212, 214, 216, 218, 220, 222, 224. Specifically, for example, the data counter-matching program 108A, 108B (FIG. 1) may determine relationships between the sub-concepts 208, 210, 212, 214, 216, 218, 220, 222, 224 by determining whether the sub-concepts are complementary sub-concepts, whereby the one or more sub-concepts 208, 210, 212, 214, 216, 218, 220, 222, 224 may include similar interpretations of determined and extracted concepts 202, 204, 206 and/or may include interpretations that can coexist or complement each other based on specific analyzed text, or whether the sub-concepts 208, 210, 212, 214, 216, 218, 220, 222, 224 are contradictory sub-concepts, whereby the sub-concepts may be contradictory. For example, and as illustrated in FIG. 2A, based on the analysis, the data counter-matching program 108A, 108B (FIG. 1) may determine that the sub-concepts 214 and 216 may be contradictory, while as illustrated in FIG. 2B, the data counter-matching program 108A, 108B (FIG. 1) may determine that sub-concepts 210, 216, and 222 may be complementary.

Figure 3:
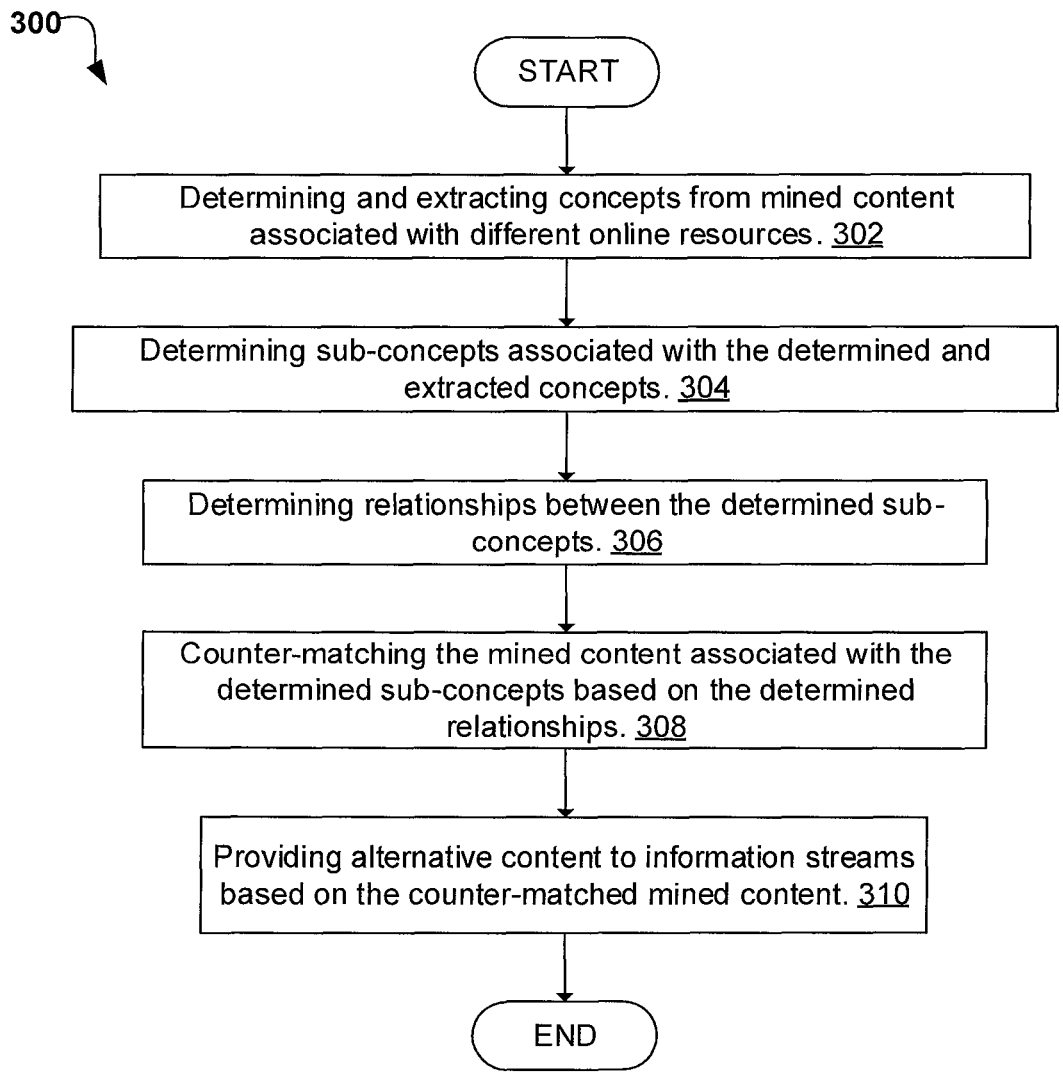
FIG. 3 is an operational flowchart illustrating the steps carried out by a program for managing user information streams associated with recommendation systems based on cognitively counter-matched mined content according to one embodiment.

Referring now to FIG. 3, an operational flowchart 300 illustrating the steps carried out by a program for cognitively counter-matching mined content is depicted. At 302, the data counter-matching program 108A, 108B (FIG. 1) may determine and extract different concepts from mined content that is associated with different online resources. Specifically, and as previously described in FIGS. 2A and 2B, the data counter-matching program 108A, 108B (FIG. 1) may mine content, and/or use a data mining service to receive mined content, from different online resources such as online news articles, publications, forums, social media websites/applications, and search engines. More specifically, the data counter-matching program 108A, 108B (FIG. 1) may use well-known data mining techniques to mine large quantities of data from machine learning, statistics, and database systems, in order to extract groups of data records (cluster analysis), unusual records (anomaly detection), and dependencies (association rule mining, sequential pattern mining), and may use databases for storing and querying the mined content.

For example, and as previously described in FIGS. 2A and 2B, the data counter-matching program 108A, 108B (FIG. 1) may data mine content that may include a series of online publications that include discussions on investment. Thereafter, the data counter-matching program 108A, 108B (FIG. 1) may then analyze the online publications. More specifically, and according to one embodiment, the data counter-matching program 108A, 108B (FIG. 1) may use data mining analysis techniques and systems that may include textual analysis, lexical analysis, sentiment analysis (discerning subjective material and extracting various forms of attitudinal information such as sentiment, opinion, mood, and emotion), natural language processing systems (including speech tagging, syntactic parsing, statistical and linguistic analysis), named entity recognition (identifying such things as named people, places, organizations and abbreviations), recognition of pattern identified entities (identifying such things as telephone numbers, mailing and emailing addresses, and units of measurement), co-referencing systems (identifying nouns, phrases, and terms referring to the same or similar object), and relationship, fact and event extraction (identification of associations among entities and other information in text). For example, the data counter-matching program 108A, 108B (FIG. 1) may perform textual analysis on the online publications by identifying and analyzing textual materials associated with the online publications that may be found on a web, file system database, and/or corpus content manager. Then, based on the textual analysis, the data counter-matching program 108A, 108B (FIG. 1) may determine and extract concepts associated with the online publications that include discussions on investment, whereby each determined and extracted concept may generally describe and categorize a sub-set of the online publications (i.e. one or a group of online publications) and/or portions of the online publications (i.e. sections within one or more online publications) based on the included text. Specifically, and as previously described in FIGS. 2A and 2B, the data counter-matching program 108A, 108B (FIG. 1) may determine that a sub-set of the online publications include specific discussions on research and development investment, a sub-set of the online publications include specific discussions on information technology (IT) investment, and a sub-set of the online publications include specific discussions on market focus. Therefore, the data counter-matching program 108A, 108B (FIG. 1) may determine and extract the concepts Research and Development (R&D) Investment 202 (FIGS. 2A, 2B), Information Technology (IT) Investment 204 (FIGS. 2A, 2B), and Market Focus 206 (FIGS. 2A, 2B).

Next, at 304, the data counter-matching program 108A, 108B (FIG. 1) may determine sub-concepts 208, 210, 212, 214, 216, 218, 220, 222, 224 (FIGS. 2A, 2B) associated with each of the determined and extracted concepts 202, 204, 206 (FIGS. 2A, 2B). Specifically, the data counter-matching program 108A, 108B (FIG. 1) may determine sub-concepts 208, 210, 212, 214, 216, 218, 220, 222, 224 that may include detailed interpretations and/or views associated with the determined and extracted concepts 202, 204, 206 (FIGS. 2A, 2B). For example, for the determined and extracted concept, Research and Development Investment 202 (FIGS. 2A, 2B), the data counter-matching program 108A, 108B (FIG. 1) may use the previously described data mining analysis techniques on the online publications associated with research and development investment to determine that certain text suggests that healthy R&D investment is critical to long term success 208 (FIGS. 2A, 2B), while certain text may suggests that R&D costs can be cut to achieve profitability 210 (FIGS. 2A, 2B). Also, for example, for the determined and extracted concept, IT Investment 202 (FIGS. 2A, 2B), the data counter-matching program 108A, 108B (FIG. 1) may analyze the online publications associated with IT investment to determine that certain text may suggest that investment in cloud can drive long term profit and savings 214 (FIGS. 2A, 2B), while certain text may suggest that investment in on-site IT solutions is critical to ensure long term profit 216 (FIGS. 2A, 2B). Furthermore, for example, for the determined and extracted concept, Market Focus 206 (FIGS. 2A, 2B), the data counter-matching program 108A, 108B (FIG. 1) may perform text analysis on the online publications associated with market focus to determine that certain text suggests that strategic long term views can contradict declared customer needs 220 (FIGS. 2A, 2B), while certain text may suggest that immediate customer needs drive future project solutions 222 (FIGS. 2A, 2B).

Then, at 306, the data counter-matching program 108A, 108B (FIG. 1) may analyze the determined sub-concepts 208, 210, 212, 214, 216, 218, 220, 222, 224 to determine relationships between the sub-concepts 208, 210, 212, 214, 216, 218, 220, 222, 224. Specifically, according to one embodiment, the data counter-matching program 108A, 108B (FIG. 1) may determine relationships between the sub-concepts 208, 210, 212, 214, 216, 218, 220, 222, 224 such as by determining whether the sub-concepts are complementary sub-concepts, whereby the one or more sub-concepts 208, 210, 212, 214, 216, 218, 220, 222, 224 may include similar interpretations of the determined and extracted concepts 202, 204, 206 and/or may include interpretations that can coexist or complement each other based on specific analyzed text, or whether the sub-concepts 208, 210, 212, 214, 216, 218, 220, 222, 224 are contradictory sub-concepts, whereby the sub-concepts may be contradictory. For example, using the previously described data mining analysis techniques, the data counter-matching program 108A, 108B (FIG. 1) may determine relationships between sub-concepts by detecting overlapping key structures between the sub-concepts. Specifically, for example, the data counter-matching program 108A, 108B (FIG. 1) may detect that sub-concept 208 may include phrases such as "R&D Investment," and "critical to long term success."

Similarly, the data counter-matching program 108A, 108B (FIG. 1) may detect that sub-concept 210 includes the phrases "R&D Investment," and "cut to achieve profitability." By analyzing and taking together the sub-concepts 208 and 210, specifically detecting some overlap in phrasing, the data counter-matching program 108A, 108B (FIG. 1) may infer a relationship between the sub-concepts 208 and 210 (in this example identical strings such as "R&D investment" are used for clarity, however, lexical analysis techniques may allow for more flexible matching to be performed).

Therefore, based on the inferred relationship between the sub-concepts 208 and 210, the data counter-matching program 108A, 108B (FIG. 1) may determine the nature of the relationship between the sub-concepts 208 and 210. For example, the data counter-matching program 108A, 108B (FIG. 1) may determine whether sub-concept 208 is complementary or contradictory to sub-concept 210. More specifically, the data counter-matching program 108A, 108B (FIG. 1) may assess the sub-concepts 208 and 210 by analyzing keywords and terms associated with the sub-concepts 208, 210 against a defined dictionary that may identify, weigh, and score a degree at which terms are complementary or contradictory. For example, the data counter-matching program 108A, 108B (FIG. 1) may use the defined dictionary to determine the degree to which terms associated with the sub-concepts are defined in a context based complimentary terms (such as "increase", "maintain", etc.) against contradictory terms (such as "decrease", "reduce", etc.). Therefore, in the previously described example, the data counter-matching program 108A, 108B (FIG. 1) may detect that sub-concept 208 may include the phrase "R&D Investment," but then is proceeded by the phrase "critical to long term success." Furthermore, using one or more data mining analysis techniques, the data counter-matching program 108A, 108B (FIG. 1) may detect that sub-concept 210 includes the phrase "R&D Investment," but then is proceeded by the phrase "cut to achieve profitability." Therefore, and as illustrated in FIG. 2A, based on the analysis using the data mining analysis techniques and the defined dictionary, the data counter-matching program 108A, 108B (FIG. 1) may determine that the sub-concepts 208 and 210 may be contradictory, while as illustrated in FIG. 2B, the data counter-matching program 108A, 108B (FIG. 1) may determine that sub-concepts 210, 216, and 222 may be complementary. According to one embodiment, the data counter-matching program 108A, 108B (FIG. 1) may further weigh the strength of each relationship to determine the degree at which the sob-concepts 208, 210, 212, 214, 216, 218, 220, 222, 224 are complementary or contradictory by scoring/ranking lists of contradictory terms against a list of terms in the defined dictionary. For example, the data counter-matching program 108A, 108B (FIG. 1) may determine that the term "decrease" may be a more contradictory term towards the term "increase," as opposed to the term "divide" being a contradictory term towards the term "increase."

Furthermore, based on the determined strength of each determined relationship, the data counter-matching program 108A, 108B (FIG. 1) may generate a cluster of sub-concepts for one or more given sub-concepts, and may score and rank the contradictoriness and/or complementariness of each sub-concept within the cluster based on the given complementary or contradictory sub-concept associated with the cluster. For example, taking into consideration the previously described example with respect to FIG. 2A, the data counter-matching program 108A, 108B (FIG. 1) may detect that sub-concept 208 may include the phrase "R&D Investment," but then is proceeded by the phrase "critical to long term success." Furthermore, the data counter-matching program 108A, 108B (FIG. 1) may detect that sub-concept 210 includes the phrase "R&D Investment," but then is proceeded by the phrase "cut to achieve profitability." Additionally, the data counter-matching program 108A, 108B (FIG. 1) may detect that a sub-concept 212 may include the phrase "R&D Investment," but then is proceeded by the phrase "provides stability but is not crucial for long term success and profit." Based on the one or more data mining analysis techniques, the data counter-matching program 108A, 108B (FIG. 1) may determine that sub-concept 210 is more contradictory towards sub-concept 208, as opposed to sub-concept 212 being contradictory to sub-concept 208. Therefore, the data counter-matching program 108A, 108B (FIG. 1) may determine that the sub-concept 212 is also contradictory to the sub-concept 208 (although not shown in FIG. 2A), but may rank the sub-concept 210 over the sub-concept 212 as the more contradictory concept against the sub-concept 208.

Next, at 308, the data counter-matching program 108A, 108B (FIG. 1) may counter-match the mined content associated with each of the determined sub-concepts 208, 210, 212, 214, 216, 218, 220, 222, 224 based on the determined relationships between the sub-concepts 208, 210, 212, 214, 216, 218, 220, 222, 224. As previously described at step 306, the data counter-matching program 108A, 108B (FIG. 1) may determine relationships between the sub-concepts 208, 210, 212, 214, 216, 218, 220, 222, 224, such as by determining whether the sub-concepts are complementary sub-concepts or contradictory sub-concepts. For example, and as previously described, the data counter-matching program 108A, 108B (FIG. 1) may determine that the sub-concepts 208 and 210 may be contradictory, and that the sub-concepts 210, 216, and 222 may be complementary. Therefore, by determining the sub-concepts that are provide contradictory, alternative, and opposing views to the sub-concepts 208, 210, 212, 214, 216, 218, 220, 222, 224, the data counter-matching program 108A, 108B (FIG. 1) may readily counter-match the mined content (e.g. online articles, news, social media posts, etc.) that supports each sub-concept 208, 210, 212, 214, 216, 218, 220, 222, 224, and provide the counter-matched content to users' information streams, whereby the counter-matched content includes the alternative content that contradicts or opposes the mined content associated with a user and the user's information streams. For example, based on the determined relationship, the data counter-matching program 108A, 108B (FIG. 1) may counter-match mined content by identifying the mined content associated with the sub-concept 210 as content that is contradictory towards the mined content associated with the sub-concept 208.

Then, at 310, the data counter-matching program 108A, 108B (FIG. 1) may provide alternative content to an information stream based on the counter-matched mined content. For example, the data counter-matching program 108A, 108B (FIG. 1) may use data mining techniques to track user activity. Furthermore, based on the tracked user activity, the data counter-matching program 108A, 108B (FIG. 1) may detect that the user may search for and/or click on content associated with the sub-concept 208. Therefore, taking into consideration the previous example, the data counter-matching program 108A, 108B (FIG. 1) may provide alternative content (i.e. complementary content and counter-matching contradictory content) by including the counter-matching mined content associated with the contradictory sub-concepts 210 and 212 to information streams (i.e. search engine results, social media streams, web and application information streams, etc.) associated with the user. For example, based on a search for content associated with the sub-concept 208, the data counter-matching program 108A, 108B (FIG. 1) may specifically retrieve from a database, interlace and present mined content associated with the sub-concepts 210 and 212 in the search results along with the content for the sub-concept 208. Furthermore, according to one embodiment, based on the rank of the sub-concept 210 over the sub-concept 212 as the more contradictory concept against the sub-concept 208, the data counter-matching program 108A, 108B (FIG. 1) may present the sub-concept 210 over the sub-concept 212 in the search results, and/or may provide more mined content associated with the sub-concept 210 over mined content associated with the sub-concept 212.

It may be appreciated that FIGS. 2A, 2B, and 3 provide only illustrations of one implementation and does not imply any limitations with regard to how different embodiments may be implemented. Many modifications to the depicted environments may be made based on design and implementation requirements.

Figure 4:
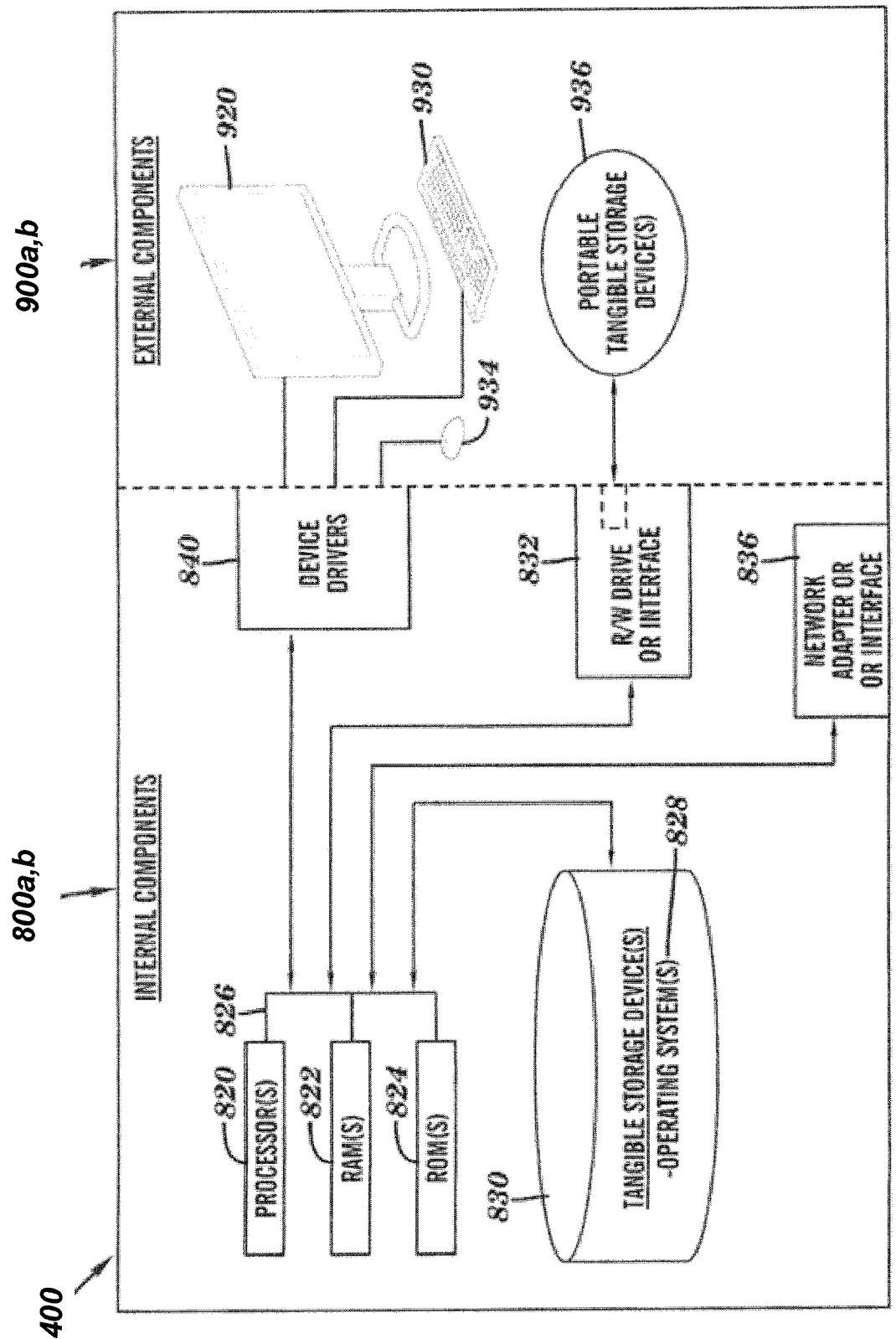
FIG. 4 is a block diagram of the system architecture of a program for managing user information streams associated with recommendation systems based on cognitively counter-matched mined content according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements. For example, the computer 102 (FIG. 2) associated with an elevator may include an interactive touchscreen (i.e. located on the elevator), and at step 306, the data counter-matching program 108A, 108B (FIG. 1) may provide a user interface to the user via the interactive touchscreen to receive the user input via a user typing on the user interface. More specifically, for example, the data counter-matching program 108A, 108B (FIG. 1) may receive user input by receiving a user typing via the interactive touchscreen and the user interface, "304" to indicate a room number, and/or "Rooftop," and/or "Weather." Additionally, according to one embodiment, the data counter-matching program 108A, 108B (FIG. 1) may provide a list of the amenities associated with a property via the interactive touchscreen and the user interface, whereby the user may select from the list an amenity of interest.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 4. Each of the sets of internal components 800 a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the data counter-matching program 108A (FIG. 1) in client computer 102 (FIG. 1), and the data counter-matching program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a data counter-matching program 108A and 108B (FIG. 1), can be stored on one or more of the respective portable computer-readable tangible storage devices 936, read via the respective R/W drive or interface 832, and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The data counter-matching program 108A (FIG. 1) and software program 114 (FIG. 1) in client computer 102 (FIG. 1), and the data counter-matching program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the data counter-matching program 108A (FIG. 1) and software program 114 (FIG. 1) in client computer 102 (FIG. 1) and the data counter-matching program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
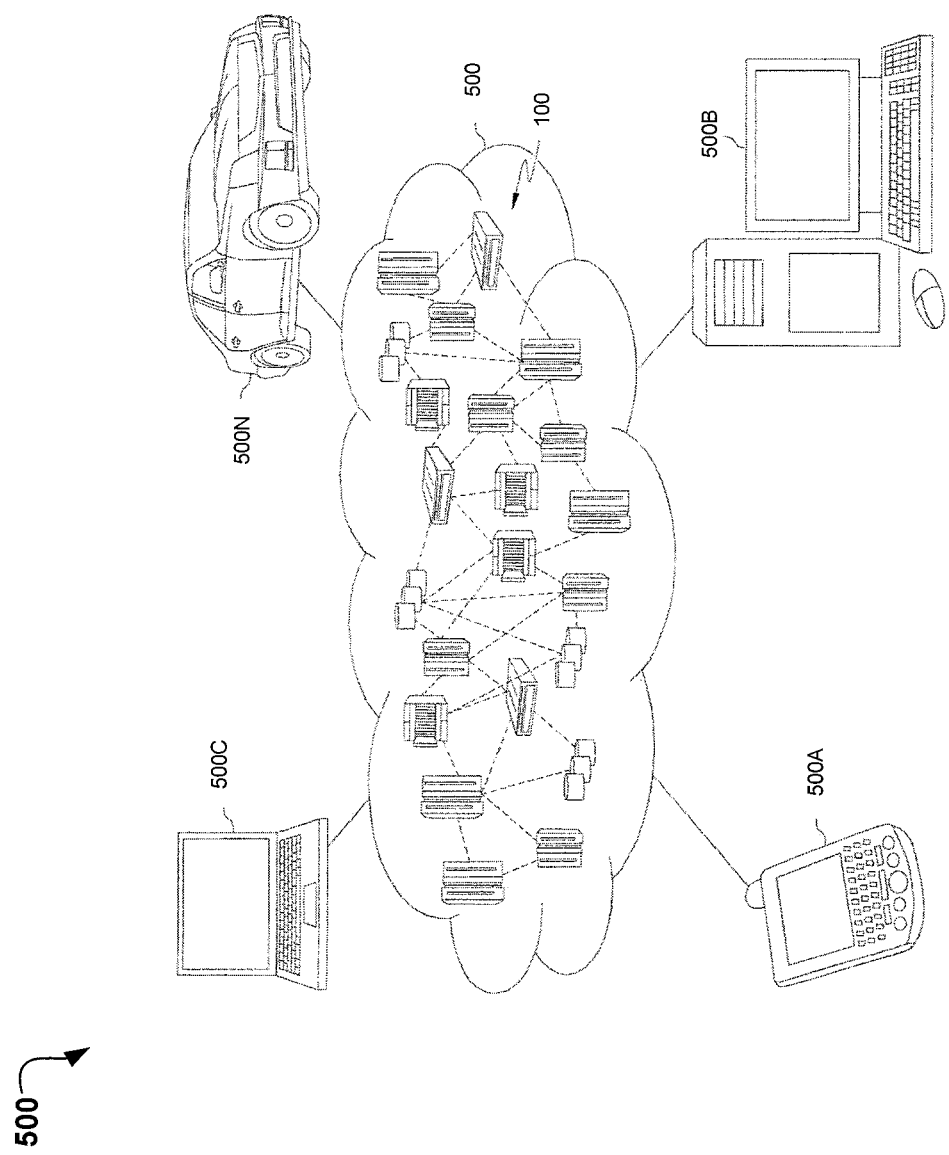
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
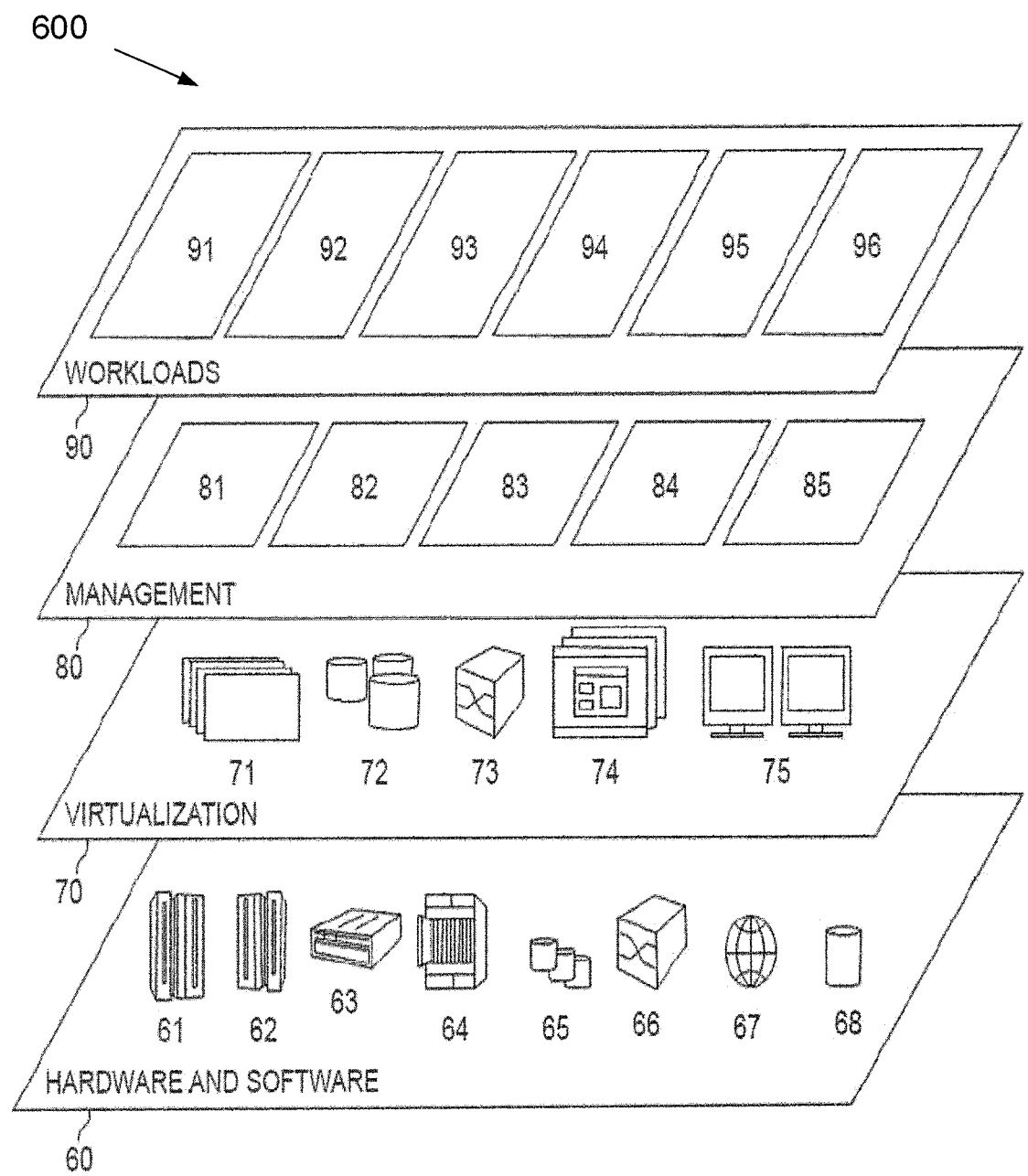
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data counter-matching 96. A data counter-matching program 108A, 108B (FIG. 1) may be offered "as a service in the cloud" (i.e., Software as a Service (SaaS)) for applications running on mobile devices 102 (FIG. 1) and may providing alternative content to information streams based on cognitively counter-matched mined content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a user information stream associated with recommendation systems based on cognitively counter-matched mined content, the method comprising:

determining and extracting a plurality of first concepts from a plurality of mined content associated with different online resources;

determining a plurality of second concepts associated with the determined and extracted plurality of first concepts, wherein the plurality of second concepts comprise one or more different interpretations of the plurality of first concepts;

determining one or more relationships between the determined plurality of second concepts by analyzing the determined plurality of second concepts using one or more data mining analysis techniques;

based on the determined one or more relationships between the plurality of sub-concepts, counter-matching the plurality of mined content, wherein counter-matching the plurality of mined content comprises determining mined content associated with the user information stream and providing counter-matched content to the mined content, wherein the counter-matched content includes alternative content that contradicts or opposes the mined content associated with the user information stream; and providing alternative content to the user information stream based on the counter-matched plurality of mined content, wherein providing the alternative content comprises interlacing and presenting the alternative content with the mined content in the user information stream.

2. The method of claim 1, wherein the different online resources are selected from a group comprising at least one of online news articles, publications, forums, social media websites, applications, and search engines.

3. The method of claim 1, wherein the determined and extracted plurality of first concepts describe and categorize a sub-set of the plurality of mined content and portions from each of the different online resources associated with the plurality of mined content.

4. The method of claim 1, wherein the one or more data mining analysis techniques is selected from a group comprising at least one of textual analysis, lexical analysis, sentiment analysis, natural language processing, named entity recognition, recognition of pattern identified entities, co-referencing, and relationship extraction.

5. The method of claim 1, wherein determining the one or more relationships between the determined plurality of second concepts further comprises:

using the one or more data analysis techniques to determine whether the one or more sub-concepts associated with the plurality of sub-concepts are contradictory or complementary.

6. The method of claim 1, further comprising:

using the one or more data analysis techniques and a defined dictionary to determine a strength of relationship for each of the determined relationships by weighing and ranking text associated with the plurality of mined content.

7. The method of claim 6, wherein providing the alternative content to the information streams based on the counter-matched plurality of mined content further comprises:

interlacing and presenting the counter-matched plurality of mined content associated with the plurality of sub-concepts that are contradictory and complementary based on the determined strength of the relationship.

8. A computer system for managing a user information stream associated with recommendation systems based on cognitively counter-matched mined content, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

determining and extracting a plurality of first concepts from a plurality of mined content associated with different online resources;

determining a plurality of second concepts associated with the determined and extracted plurality of first concepts, wherein the plurality of second concepts comprise one or more different interpretations of the plurality of first concepts;

determining one or more relationships between the determined plurality of second concepts by analyzing the determined plurality of second concepts using one or more data mining analysis techniques;

based on the determined one or more relationships between the plurality of sub-concepts, counter-matching the plurality of mined content, wherein counter-matching the plurality of mined content comprises determining mined content associated with the user information stream and providing counter-matched content to the mined content, wherein the counter-matched content includes alternative content that contradicts or opposes the mined content associated with the user information stream; and providing alternative content to the user information stream based on the counter-matched plurality of mined content, wherein providing the alternative content comprises interlacing and presenting the alternative content with the mined content in the user information stream.

9. The computer system of claim 8, wherein the different online resources are selected from a group comprising at least one of online news articles, publications, forums, social media websites, applications, and search engines.

10. The computer system of claim 8, wherein the determined and extracted plurality of first concepts describe and categorize a sub-set of the plurality of mined content and portions from each of the different online resources associated with the plurality of mined content.

11. The computer system of claim 8, wherein the one or more data mining analysis techniques is selected from a group comprising at least one of textual analysis, lexical analysis, sentiment analysis, natural language processing, named entity recognition, recognition of pattern identified entities, co-referencing, and relationship extraction.

12. The computer system of claim 8, wherein determining the one or more relationships between the determined plurality of second concepts further comprises:

using the one or more data analysis techniques to determine whether the one or more sub-concepts associated with the plurality of sub-concepts are contradictory or complementary.

13. The computer system of claim 8, further comprising:

using the one or more data analysis techniques and a defined dictionary to determine a strength of relationship for each of the determined relationships by weighing and ranking text associated with the plurality of mined content.

14. The computer system of claim 13, wherein providing the alternative content to the information streams based on the counter-matched plurality of mined content further comprises:

interlacing and presenting the counter-matched plurality of mined content associated with the plurality of sub-concepts that are contradictory and complementary based on the determined strength of the relationship.

15. A computer program product for managing a user information stream associated with recommendation systems based on cognitively counter-matched mined content, comprising:

one or more computer-readable storage devices and program instructions stored on at least one of the one or more tangible storage devices, the program instructions executable by a processor, the program instructions comprising:

program instructions to determine and extract a plurality of first concepts from a plurality of mined content associated with different online resources;

program instructions to determine a plurality of second concepts associated with the determined and extracted plurality of first concepts, wherein the plurality of second concepts comprise one or more different interpretations of the plurality of first concepts;

program instructions to determine one or more relationships between the determined plurality of second concepts by analyzing the determined plurality of second concepts using one or more data mining analysis techniques;

based on the determined one or more relationships between the plurality of sub-concepts, program instructions to counter-match the plurality of mined content, wherein counter-matching the plurality of mined content comprises program instructions to determine mined content associated with the user information stream and providing counter-matched content to the mined content, wherein the counter-matched content includes alternative content that contradicts or opposes the mined content associated with the user information stream; and program instructions to provide alternative content to the user information stream based on the counter-matched plurality of mined content, wherein providing the alternative content comprises interlacing and presenting the alternative content with the mined content in the user information stream.

16. The computer program product of claim 15, wherein the determined and extracted plurality of first concepts describe and categorize a sub-set of the plurality of mined content and portions from each of the different online resources associated with the plurality of mined content.

17. The computer program product of claim 15, wherein the one or more data mining analysis techniques is selected from a group comprising at least one of textual analysis, lexical analysis, sentiment analysis, natural language processing, named entity recognition, recognition of pattern identified entities, co-referencing, and relationship extraction.

18. The computer program product of claim 15, wherein the program instructions to determine the one or more relationships between the determined plurality of second concepts further comprises:

program instructions to use the one or more data analysis techniques to determine whether the one or more sub-concepts associated with the plurality of sub-concepts are contradictory or complementary.

19. The computer program product of claim 15, further comprising:

program instructions to use the one or more data analysis techniques and a defined dictionary to determine a strength of relationship for each of the determined relationships by weighing and ranking text associated with the plurality of mined content.

20. The computer program product of claim 19, wherein the program instructions to provide the alternative content to the information streams based on the counter-matched plurality of mined content further comprises:

program instructions to interlace and present the counter-matched plurality of mined content associated with the plurality of sub-concepts that are contradictory and complementary based on the determined strength of the relationship.

* * * * *